July 14, 1970  R. I. STIWARD  3,520,136

HYDRAULIC BRAKE SYSTEM AND THE LIKE

Filed March 30, 1967  2 Sheets-Sheet 1

INVENTOR.
RUNE INGVAR STIWARD
BY Robert J. Henry
ATTORNEY

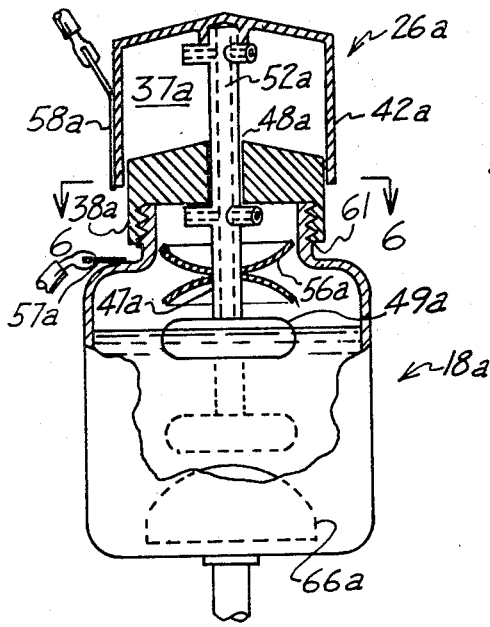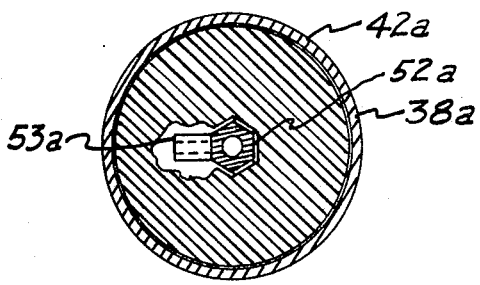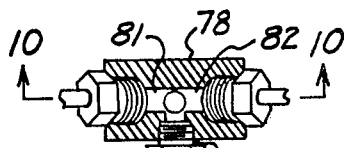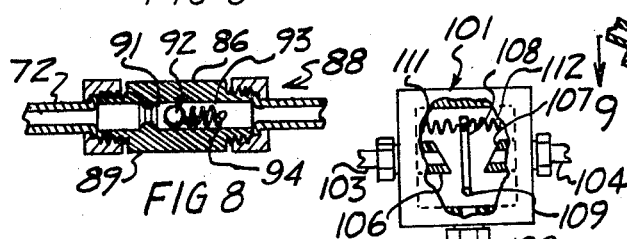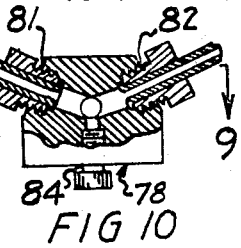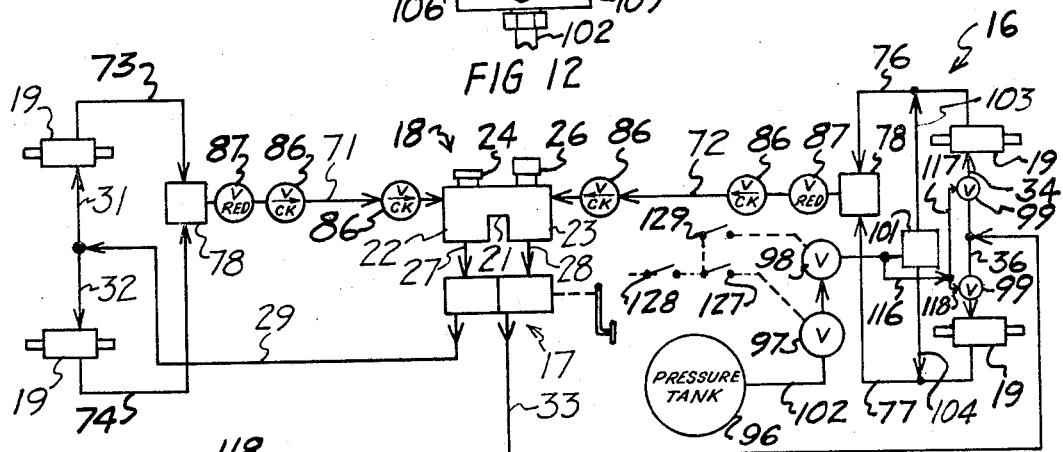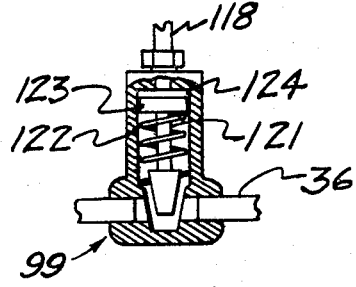

United States Patent Office 3,520,136
Patented July 14, 1970

3,520,136
HYDRAULIC BRAKE SYSTEM AND THE LIKE
Rune Ingvar Stiward, 598 Maureen Lane,
Pleasant Hill, Calif. 94523
Filed Mar. 30, 1967, Ser. No. 627,158
Int. Cl. F15b 7/00, 7/08
U.S. Cl. 60—54.5
9 Claims

ABSTRACT OF THE DISCLOSURE

This invention provides a hydraulic brake system for automobiles and the like in which safety features are added to the regular brake system; the safety features including an improved vent for the reservoir together with a gauge for showing low fluid conditions; a recirculating system which provides new and good fluid to the wheel cylinders together with automatic bleeding of the cylinders, and a powered emergency brake capable of stopping the vehicle under abnormal conditions, as well as dirt traps and other devices to assure proper operation of the various components.

Figure 1:
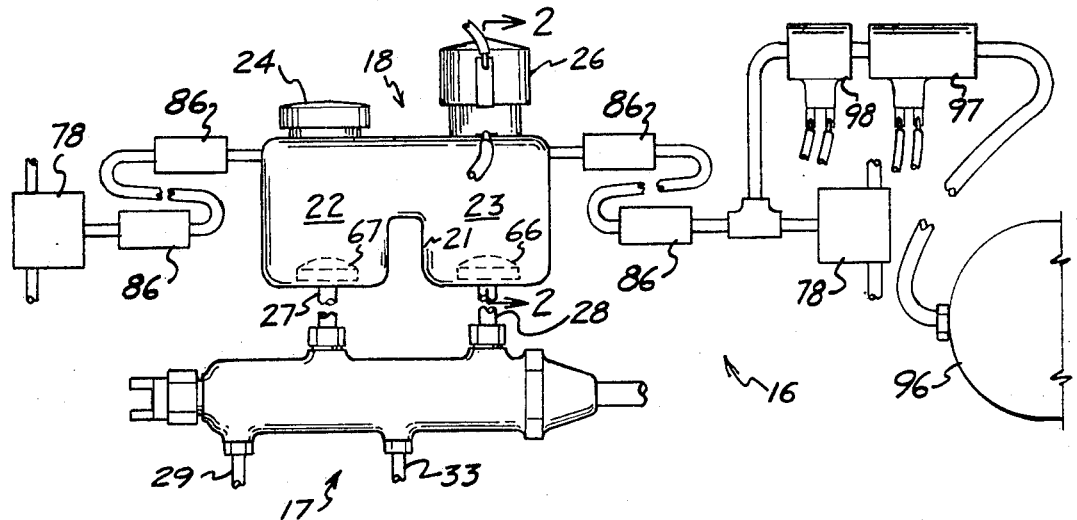

The present invention relates to a hydraulic brake system, and more particularly to a hydraulic brake system having improved safety structures constructed to correct the most frequent causes of brake failure. In addition, the present invention also provides a special emergency brake capable of stopping a vehicle under abnormal conditions, which occur when the brake system of the vehicle is damaged.

As traffic becomes more congested, and more and more high speed freeways are constructed, people have become more and more dependent upon the operation of their brakes. Nevertheless, very little has been done until recently to improve the basic system used for hydraulic brakes since their introduction in the early 1930's. One of the very important improvements resides in the use of the multiple or tandem master cylinder which, in effect, provides two independent brake systems, each of which operates half of the wheels. While this improvement is valuable, there is still considerable room for more improvement, and the present invention is designed to make the hydraulic brakes now in use considerably safer. In fact, use of all of the improvements disclosed herein will make the brakes virtually foolproof.

One cause of serious brake failure is the complete plugging of the vent for the fluid supply reservoir, which reservoir provides fluid to the master cylinder. When this vent is plugged up, an inadequate or no supply of fluid to the master cylinder occurs, which results in impairment of or complete loss of brakes. This problem can result in such failure even with the dual system, because the dual systems now in use have one reservoir. A satisfactory solution to this problem is provided in my U.S. Pat. No. 2,866,866, and the present invention provides an improvement over this patent.

The reservoir must be kept clean at all times because small pieces of dirt can clog a necessary port and cause a brake failure. Accordingly, the supply reservoir should be closed with a vent provided which is safe from entry of dust and dirt. In accordance with the improved form of vent described herein, a substantially annular passage of a rather thin dimension between the circles or similar geometric figures defining the passage is provided, with the passage extending substantially vertically downward and having its opening to the outside on the lower end thereof. In its preferred form, a gauge is provided to indicate the level of the brake fluid within the reservoir. This gauge is provided by making the breather cap in two telescoping sections, with the annular passage defined between the elements, and with the upper element having a downwardly depending stem member equipped with a float at the lower end thereof.

Preferably the annular passage leads to an intermediate chamber having a floor through which the stem member extends. A second passage is then provided through the stem to provide communication between the intermediate chamber and the reservoir. In addition to providing the necessary vent to the reservoir, the passages of the breather are important to assist in the automatic bleeding of air from wheel cylinders as provided in the preferred form of the invention, because the air so removed passes through the reservoir as discussed below.

With the construction indicated above, the breather not only provides a reliable passage which will not admit dirt under the usual conditions, but it also provides a gauge. This gauge can be read by means of indicia provided on the breather, or by the use of contacts on the breather which close a switch means and activate a light or other electric device when the fluid is low.

Brake fluid is required by law to meet rather rigid standards calculated to assure saftety. However, another problem which frequently occurs in hydraulic brakes is the breakdown of the fluid in the wheel cylinders. Since each wheel cylinder is a blind passage, brake fluid may remain in the wheel cylinders for years. Of course, periodic bleeding of the wheel cylinders will provide new fluid in the cylinders, but wheel cylinders are often not bled for various reasons, and brake fluid may remain in a given wheel for ten years or more. This may be due to a broken bleeder coupled with improper maintenance, or simply because the cylinder does not appear to need bleeding.

When braking fluid breaks down in the wheel cylinder it loses its resistance to boiling, and sometimes corrosive water conditions also result. These factors may cause sudden wheel cylinder failure, loss of fluid, and loss of brakes The brake fluid in the wheel cylinders also becomes overheated, particularly on long down hill driving conditions in heavy traffic. Such overheating also provides a hazard to proper operation of the brakes.

In accordance with the present invention, these problems are overcome by providing a return line extending between each wheel cylinder and the reservoir, with the return line being formed with means for providing that only a small amount of brake fluid is returned from each wheel cylinder. Preferably, these means are in the form of a metering check valve, which closes completely after allowing a small amount of fluid to leave each of the wheel cylinders. The check valves are important to provide a fixed position of the pedal, because in the absence of such means the pedal will slowly move to the floor during long application of the brakes. The return lines are also preferably made small enough that even without the check valves, a small amount of fluid will pass through in the usual braking time. I also prefer to use two check valves so that one will back up the other.

With the brake fluid capable of such recirculation, it is seen that fresh brake fluid is applied to the wheel cylinders. This not only prevents the residence of old fluid for undue lengths of time, but also, it provides automatic bleeding of the cylinders and cooling of the wheel cylinders. Since this bleeding of air or the like is returned to the reservoir, it is seen that the improved vent of this invention is important to assure ready removal of air.

In spite of the precautions provided by the improved brake systems of this invention, emergency conditions sometimes occur which cause brake failure such as breakage due to minor collisions or other causes. For example, breakage of an axle or the like can cause breakage of a wheel cylinder and sudden loss of fluid. While the hand brake will provide some emergency braking action, it is not sufficient, in many cases, to prevent further and serious damage. Accordingly, it is another feature of this invention to provide an emergency brake to a plurality of wheel cylinders, which will provide braking to an undamaged cylinder.

Briefly speaking, the emergency brake comprises a source of gas under pressure, a normally closed line extending from said source of gas to a wheel cylinder, and valve means in the normally closed line and a valve in the main supply line to the cylinder together with control means for operating the valves. Preferably, the emergency line will come into the return line and push brake fluid ahead of the gas, which will usually be compressed air. It is also a feature of the invention to provide emergency braking to a plurality of wheel cylinders through a special valve which will close off a damaged cylinder automatically before undue gas pressure is lost so that one or more undamaged cylinders can be set up into braking position. The emergency brake system should also have a reset valve in the form of a controlled bleeder which will relieve the pressure and relieve the brakes.

Other elements are also provided to catch dirt that may enter the system so that the dirt will lie harmlessly until removed by maintenance cleaning. Other construction features include designs that will facilitate cleaning as will become apparent in the description of the preferred form of the invention below.

From the foregoing description, it is seen that it is a primary object of the invention to provide an improved hydraulic brake system designed to prevent the most frequent causes of brake failure that occurred prior to this invention without in any way reducing the present braking action and efficiency now in use.

Another object of the invention is the provision of an emergency brake system which will provide power brakes when the regular brake system fails.

A still further object of the invention is the provision of a hydraulic brake system which automatically performs certain maintenance steps such as bleeding air from wheel cylinders, removing dirt from the fluid, and replacing the fluid in the wheel cylinders.

Further objects and advantages of the invention will be apparent as the specification progresses, and the new and useful features of the hydraulic brake system will be fully defined in the claims attached hereto.

Figures 2, 3, 4:
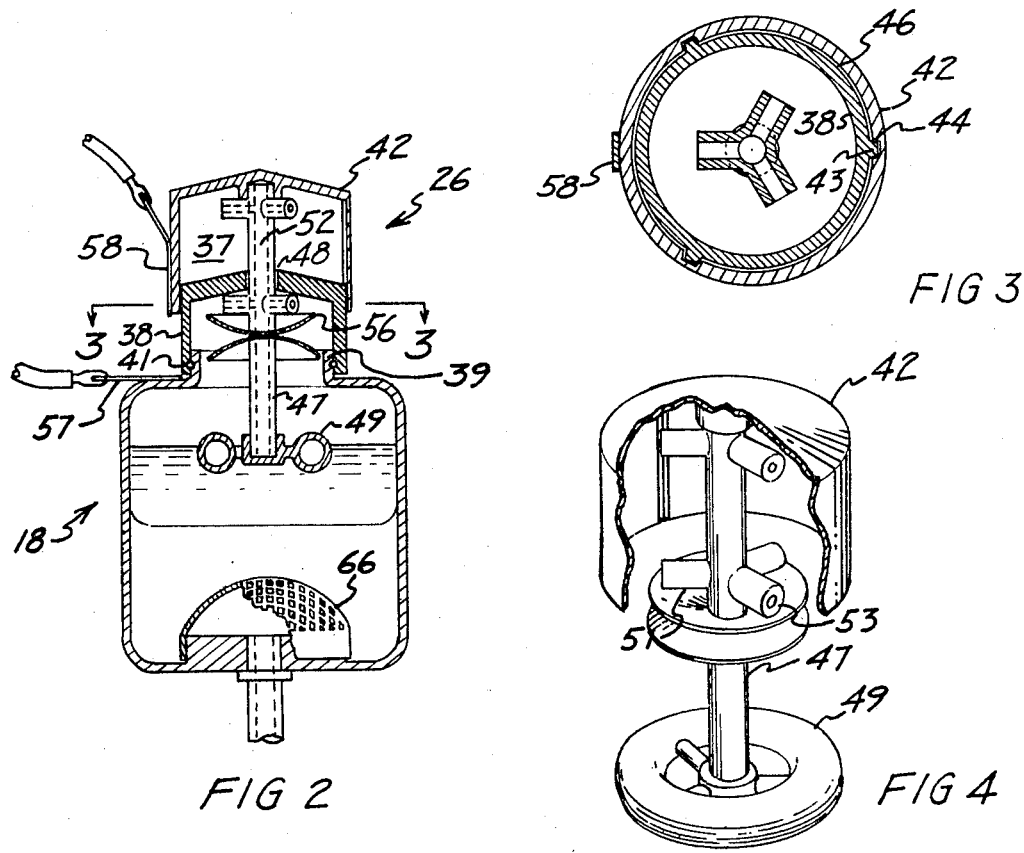

The preferred forms of the invention are illustrated in the accompanying drawings, in which:

FIG. 1 is a diagrammatic view of a typical brake system constructed according to the invention illustrating the various parts;

FIG. 2, a sectional view of the reservoir shown in FIG. 1, substantially as seen in the plane of line 2—2 thereof;

FIG. 3, a sectional view taken substantially in the plane of line 3—3 of FIG. 2;

FIG. 4, a fragmentary view of the cover member of the breather of the reservoir shown in FIG. 2;

FIG. 5, a view similar to that of FIG. 2, but showing an alternate form of reservoir;

FIG. 6, a sectional view taken substantially in the plane of line 6—6 of FIG. 5;

FIG. 7, a diagrammatic view of a complete brake system constructed according to the invention;

FIG. 8, an elevational view, partly in section, illustrating a typical metering check valve used in the return line of the system shown;

FIG. 9, a sectional view of a typical form of dirt trap used in the system shown, as seen in the plane of line 9—9 of FIG. 10;

FIG. 10, a sectional view of the dirt trap shown in FIG. 9 as seen in the plane of line 10—10 thereof;

FIG. 11, an elevational view, partly in section, showing an air actuated shut-off valve illustrating a typical valve used in the emergency brake-provided herein; and FIG. 12, a top view, with portions broken away to illustrate internal parts, of an automatic pressure-responsive control valve suitable for use in the emergency brake shown.

While only the preferred forms of the invention are shown, it should be understood that various changes and modifications may be made within the scope of the claims hereto attached without departing from the spirit of the invention.

Referring to the drawings in greater detail, there is shown a hydraulic brake system 16 containing a master cylinder 17, a reservoir 18 for supplying liquid under pressure to a plurality of wheel cylinders 19 (see FIG. 7). As here shown, the reservoir 18 is constructed for a dual brake system and has a partial partition 21 dividing the reservoir into two sections 22 and 23 with the filler cap 24 being disposed over one section and breather 26 being disposed over the other. However, it will be appreciated that a single reservoir and unitary master cylinder could be used with this invention by adapting the various parts. In such case the breather will replace the regular filler cap, and be located centrally at the top of the reservoir.

As indicated above, the improvements of this invention are additive to the regular brake system. Accordingly, as shown in the diagram of FIG. 7, the system of this invention not only includes the reservoir 18, master cylinder 17 and wheel cylinders 19, but also includes the usual connecting lines. Thus lines 27 and 28 extend between the bottom of the reservoir from each section to the inlet portions of each section of the tandem master cylinder. Master cylinder outlet line 29 extends to branch lines 21 and 32, which lead to the front wheel cylinders so that the usual communication is provided between the master cylinder and the front wheel cylinders. In the same way, communication between the other section of the master cylinder and the back wheels is achieved through line 33 and branch lines 34 and 36.

With the dual system illustrated, a safety factor is introduced, which is becoming standard. With this system, gross leakage, failure of a wheel cylinder, or other malfunction in one of the two systems which renders it inoperative, leaves the other system in operation. Thus failures which heretofore caused complete brake failure now only cause one-half of the brakes to be lost. Nevertheless, certain problems still can cause complete brake failures. One of these is the clogging of the vent in the reservoir, which causes a partial vacuum therein, and prevents supply of necessary fluid to the master cylinder.

Dirt in the brake fluid causes another problem, and in spite of all of the usual precautions, dirt often gets into the fluid. The dirt problem is also related to the problem of venting, because large vents allow easier entry of dirt. Accordingly, the improved breather of this invention is formed to reduce the dirt problem to a minimum, and auxiliary means in the form of dirt screens and traps are provided to assist when dirt does get into the system for whatever reason.

The preferred breather 26 especially suitable for use in a dual brake system is illustrated in detail in FIGS. 2 through 4. As there shown, the breather comprises a housing located on the upper part of the reservoir 18 defining a chamber 37. The housing is constructed with two sections which fit in telescoping relation. One section serves as a lower cover member 38 adapted to fit over a neck 39 so as to be removable when it is desirable or necessary to service section 23 of the reservoir. As here shown, closure 38 fits in place through a snap ring 41, but it will be appreciated that any suitable removable securing means could be used.

The other section of the housing is a cover member 42 formed to fit in telescoping relation over closure 38. As best seen in FIG. 3, the closure 38 has lands 43 and the cover 42 has grooves 44, with the lands and grooves formed to fit together and hold the cover in central alignment with respect to the closure. In addition, the cover 42 and closure 38 are dimensioned and positioned to provide an annular space 46 therebetween. This space is constructed with a relatively narrow dimension determined by the two circular walls defining the space in such a way that the space forms a downwardly extending passage communication between the chamber 37 and the outside. This provides for excellent venting, with a minimum likelihood of entry of dirt into the chamber through the passage.

The cover 42 also comprises a depending stem 47 centrally located and dimensioned to fit slidingly through a hole 48 in the closure 38. The stem is preferably equipped with a float 49 at or near the lower end thereof, whereby the vertical position of the cover is determined by the level of the brake fluid within the reservoir. In order to prevent the float from being lifted too high and lifting the cap 42 too much, a stop 51 is provided to abut the lower surface of closure 38, and positively prevent the cover from being moved out of telescoping position. A positive vent passage is provided between the chamber 37 and the internal space of the reservoir by means of a passage 52 disposed within the stem 47.

As shown here, the passage 52 includes a hollow section in the stem and a hollow branch passage 53 in the stop as well as a hollow branch passage 54 at the top of the stem. These branch passages provide openings in positions where dirt and brake fluid is least likely to enter the passage. In order to protect the opening of branch passage 53, a splash shield 54 is preferably provided. This shield is formed to provide a baffle in close relation to the opening in the branch passage, and may include a drain hole (not shown) to prevent accumulation of undue amounts of fluid therein. With the convex form shown it can also serve as a dirt trap by keeping the drain hole or holes away from the central area.

The telescoping cap and float serve to provide a gauge whereby low fluid conditions can be detected before they become too serious. When low fluid conditions arise the brakes should be checked to determine the cause, because the fluid should remain at the proper level. In addition, fluid can be added as an initial remedy to assure proper braking prior to a proper and complete check. The gauge may take more than one form, and the device shown in FIGS. 1 through 4 has two gauges. One of these is in the form of visual markings on the wall of the closure to indicate the condition of the brakes whereby a check can be made without opening the reservoir. These indicia might include red and green areas, with the green area showing when sufficient fluid is present and the red area only visible when the fluid is too low. Alternatively, the areas may be red when a dangerous condition is present, yellow when fluid should be added and green when sufficient fluid is present.

Another form of gauge is an electrical signal device constructed to give a signal when the fluid level reaches a dangerous condition. The signal may operate a light or other device located on the instrument panel so the driver can notice the condition immediately. As best seen in FIG. 2, the signal is made by contacts 57 and 58 located on the closure 38 and cap 42 respectively, with the contact 58 ordinarily being grounded, and the contact 57 being insulated from the body of the reservoir when a metal reservoir is used. The travel of the cap between the stop position and lower empty position is determined by the dimensions of the particular elements, with the gauge showing a dangerous condition before the fluid gets lower than the dividing area of the partition 21 in the reservoir. In this way, loss of fluid from either section of the dual system will be detected.

In FIGS. 5 and 6, there is shown an alternate form of breather constructed to fit on a single reservoir and master cylinder system. As there shown, a breather 26a is formed with threads 61 constructed to fit in place of the regular filler cap on the reservoir 18a. Otherwise the structures are quite similar and comprise a housing defining a chamber 37a formed by a closure member 38a and a cover 42a defining a passage 46a therebetween. The cover 42a has a stem 47a constructed with a float 49a at the bottom thereof, and a stop 51a and splash shield 56a, with a passage 52a extending through the stem. Contacts 57a and 58a are also provided, as well as visual indicia on closure 38a to provide a gauge.

In general, the corresponding structures are similarly constructed and function in a similar manner; however, minor design changes are present, as is apparent from the drawing. For example, the cap has a greater travel, because of the fact that the reservoir does not have a partition, and the fluid can get lower before the danger point is reached. In addition, the closure is thicker and the closure is formed with a bearing surface to guide the cap rather than relying on the lands and grooves used in the embodiment of FIGS. 1 through 4. It will be appreciated that other changes could be made in either form and that different combinations could be used without departing from the spirit and scope of the invention.

Another feature of the invention is the inclusion of various structures designed to trap dirt particles and keep them from getting into operating areas where they can cause a malfunction. Referring again to FIGS. 1 and 2, there is shown an enlarged screen 66 adapted to fit over the inlet of line 28 in order to prevent dirt from flowing from the reservoir into the master cylinder. Similarly, a screen 67 is provided to prevent ingress of dirt into line 27. These screens are generally hemispherical and constructed with a large enough surface that the flow of fluid is substantially unimpeded. At the same time any dirt is washed off the screen by the geyser effect from the cylinder, and then falls to the bottom where it remains until the reservoir is serviced. In the embodiment of FIG. 5, a screen 66a is provided for the same purpose.

The screens also tend to dampen the geyser effect so that it does not knock the floats around an excessive amount. It will also be noticed that with the filler cap 24 over one section of the reservoir and the breather over the other section, easy access for cleaning is available.

Another feature of the preferred form of the invention is the provision of a return line extending from each wheel cylinder back to the reservoir. However, it is important to provide certain elements in the return line so that the regular brake system functions properly. For example, the return system here shown provides a pair of return lines 71 and 72 in communication with its section of the reservoir, and each return line has branch lines leading to the wheel cylinders of the particular portion of the dual system. Thus return line 71 includes branch lines 73 and 74, while return line 72 includes branch lines 76 and 77. At each junction, a dirt trap 78 is conveniently provided.

As best seen in FIGS. 9 and 10, the dirt trap 78 is formed from a single block 79 having holes 81 and 82 drilled on a downward angle and threaded to receive standard fittings. Another hole 83 is similarly formed so that the branch lines and main return lines are joined within the block. A bottom hole 84 is also provided with a bleeder fitting therein to empty the dirt trap. If desired, a screen could be added over the entry to the main return line, but the downward taper is usually sufficient. Since a bleeder is provided on each dirt trap, it is contemplated that the branch return lines could be placed in each wheel cylinder where the regular bleeder is fit. With this construction, the usual bleeder could be taken away from the wheel cylinder, but it will be appreciated that both the branch line and a bleeder could be put into each wheel cylinder, if desired.

It is also important that only a small amount of brake fluid is allowed to flow through the return line so that the return line does not prevent the normal desired braking action. In order to assure that only a small amount of brake fluid flows through the return line, the lines are preferably constructed with a small diameter to resist flow.

This will assure the desired back pressure to hold the wheel cylinders. However, in such a case, the brake pedal will drift toward the floor as fluid is returned from the wheel cylinders. In order to prevent this drift, it is preferred to include at least one metering check valve 86 in the return line, which will close off the line after allowing a small amount of fluid to flow. Preferably the check is designed to allow only a few drops of fluid to pass therethrough before closing in order to assure rapid and efficient braking.

Another component should be placed in the return line in order to assure proper operation of the wheel cylinders. In regular operation, the wheel cylinders return after braking by means of springs which bring the pistons in the cylinders back to a normal position. In doing so, fluid is forced back through the main lines to the master cylinder through a check valve located therein which is held by a spring in the cylinder. In this way, fluid pressure is retained in the wheel cylinders and associated lines. This pressure keeps the wheel cylinders in a ready position and assures rapid operation on the next braking operation. For this reason, it is proposed to place pressure retaining means in the return line. Preferably, this pressure retaining means will be in the form of a pressure reducing valve 87 which will be adjusted for the same pressure reduction as is provided in the master cylinder.

A typical metering check valve 86 that may be used is shown in FIG. 8. As there shown, the valve is placed in line 72 which is formed to allow fluid flow in the direction of arrow 88. Flow in the opposite direction is positively prevented by the pressure reducing valve 87 which is spring loaded and serves as an immediate check valve also. Referring again to FIG. 8, it is seen that the metering check valve includes a housing 89 having threads formed to receive standard fittings for securing the line 72 thereto at each end so that the housing becomes part of the line.

The housing contains a valve seat 91, a ball 92, and a spring 93 anchored in the housing at 94. The spring is formed to return the ball to the position shown, but allow the ball to move into the seat 91 when the fluid flows. In this way, a small amount of fluid moves through the seat before the ball checks the flow. After the brake is released and the pressure on the ball is relaxed, the spring 93 brings the ball back to a normal or ready position so that the metered amount of fluid will flow on the next application of the brakes. In the system shown in FIG. 7, it is seen that each main return line has two metering check valves, however, one valve will normally be sufficient. The second valve is provided as a safety feature, and it will be appreciated that other components such as the pressure reducing valve could be provided in tandem if desired.

In operation, the brake system shown in FIG. 7 functions substantially as follows: When the brake pedal is pushed down, brake fluid moves under pressure from the master cylinder 17 through main lines 29 and 33 to each of the wheel cylinders 19. A small amount of fluid moves out of each wheel cylinder as regulated by the metering check valves 86, and returns to the reservoir. Even though this fluid is returned, the wheel cylinders will immediately set up to apply the brakes. With the metering check valves closed, the wheel cylinders will remain in braking position until the pedal is released.

With a small amount of fluid returned on each application of the brakes, it will be appreciated that any air in the wheel cylinder will go through the return line and thence out into the air space in the reservoir. In this way, the brakes are automatically bled. In addition, the return of a small amount of fluid will assure mixture of the fluid in the wheel cylinders with the main body of fluid where the desired composition will be kept close to the required characteristics.

The recirculation of fluid will also have other advantages such as cooling of the wheel cylinders by taking out hot fluid and bringing in cool fluid. This is important when the brakes are used frequently as on down hill driving. In this way, braking efficiency is kept at a higher level as well as preventing corrosive components from separating out of the fluid and damaging the wheel cylinders. This solves or reduces one of the major causes of wheel cylinder failure.

After the brake pedal has been pushed down and the brakes applied as explained above, the brakes are released by allowing the pedal to return. The springs in the wheel cylinders bring the pistons therein back to a relaxed position, and help force fluid back through the main line into the master cylinder. The master cylinder check valve and the pressure reducing valves in the return lines will retain the proper wheel cylinder piston position and be ready for rapid application.

After pedal retraction, the metering check valves 87 are each reset by action of the spring 93 therein. Preferably, the metering check valves are placed between the pressure reducing valve and the reservoir, as shown, but it will be appreciated that other locations will be operative. It will also be appreciated that the circulation of brake fluid herein provided will bring the fluid past the dirt traps and screens and traps in the reservoir. In this way any dirt entering the system will usually be caught before any harm can result therefrom.

In addition to the brake system described above, the preferred form of the invention also includes an emergency brake system. As shown in FIG. 7, the emergency brake system here shown comprises a tank 96 for providing a source of air or other gas under pressure, a control valve 97 which is normally closed and formed to open when it is desired to apply the emergency brakes, a reset valve 98 which is normally closed but provides a vent to the atmosphere when opened under suitable controls, lines extending from the source of air through the control valve to the wheel cylinders, and back-up valves 99 in the supply lines to the cylinders, with the back-up valves coupled into the air lines to operate automatically.

In the system shown in the drawings, the emergency brake system is coupled into the two rear wheel cylinders, but it will be appreciated more wheel cylinders could be so equipped, if desired. One of the features of the emergency brake system of the invention is the provision of means for shutting off broken wheel cylinders so that the other cylinder(s) can give braking action. For example, if one wheel cylinder is broken during a collision or from other causes, fluid will leak therefrom, and possibly cause complete failure of the regular brakes (depending on whether a tandem system is provided and whether both parts are operating). If one of the wheel cylinders used in the emergency brake is broken, it will also prevent operation of the emergency brake unless means are provided to shut out the defective cylinder.

Thus in the emergency brake system shown, a switching valve 101 is provided which will shut off the supply to a defective cylinder automatically and allow the remaining cylinder or cylinders to operate. A typical switching valve is shown in FIG. 12 which is placed at a junction of a main line 102 leading from the source of pressure, and a branch line 103 leading to one wheel cylinder and a branch line 104 leading to another wheel cylinder. The switching valve is sensitive to pressure changes between lines 103 and 104 and operates to shut off a line that has an extreme pressure reduction due to a leak or the like.

Referring again to FIG. 12, it is seen that lines 103 and 104 are formed with seats 106 and 107 constructed to be closed by flapper valve element 108, which element is pivotally mounted by a pin 109 so that it can move over either seat. The valve element 108 is normally held in a neutral position by yieldable holding means such as springs 111 and 112.

With this construction, it is seen that opening of valve 97 will provide air or gas pressure against brake fluids to set up both rear wheel cylinders, unless one is taken out of operation by the switching valve. However, it will be appreciated that back up means are required to prevent the fluid pressure from going back to the master cylinder. In order to prevent this, the back up valves 99 are automatically closed on opening of valve 97. As here shown, the automatic closing of valves 97 is achieved by an air interlock and air operated valves. However, it will be appreciated that electrically operated valves could be used which are coupled in the electrical control of valve 97, if desired.

In the form shown, the valves are actuated by pressure in main line 102 from a position, just in advance of switching valve 101 through supply line 116 and branch lines 117 and 118. The back up valve provided in branch supply line 36, which is controlled by branch air line 118 is shown in FIG. 11. This valve comprises a valve stem 121 normally kept open by spring 122, and closed by action of the piston 123 in cylinder 124 when the cylinder is pressurized an amount sufficient to overcome the spring.

Reset valve 98 is simply a valved vent open to the outside for relieving pressure in the system. Valve 97 is electrically controlled in a conventional manner, and is actuated by a switch 127 coupled through ignition switch 128, while reset valve 98 is operated by switch 129 (also coupled through the ignition switch). Other electrical controls can be used without departing from the invention, and it is contemplated that reset switch 129 could be dependent on the use of switch 127 by known electrical controls.

Preferably, the reset valve is located as close as possible to main valve 97, and opened during initial installation so that all lines in the emergency system are filled with brake fluid. In other words air is bled out of the emergency system back to valve 97 by conventional methods with the air being removed through the reset vent. This substantially eliminates compressible air in the lines which would otherwise reduce the normal braking operation. In addition, the emergency lines between the valve 97 and wheel cylinders should carry enough fluid that air does not normally enter the wheel cylinders when the emergency brakes are set.

Thus in operation of the emergency brakes, air from tank 96 will set up the brakes. When it is desired to return the brakes, valve 97 is closed and reset valve opened to bleed out the air and return the brakes. Preferably, on reset, the brake pedal is slightly depressed to force fluid through the reset vent and clear the air from the system. However, when the brakes are completely out of action, and the emergency brake used, the car should not be moved until serviced.

The tank 96 is usually pressurized from air at a service station and contains the usual fittings to receive the conventional air hose. It may also contain a gauge and other devices to assist the driver and maintenance men to service it.

While the preferred emergency system is shown in FIG. 7, it will be appreciated that a simplified version could be provided which does not contain the automatic shut-off means 101. In such a case, the air system is conveniently brought into the return line between the dirt trap 78 and the first metering check valve 86 as shown in the diagram of FIG. 1. As there shown, the first metering check valve will be next to the dirt trap and second metering check valve close to the reservoir. The pressure reducing and reverse check valve 87 will be placed in the section broken away and is not shown in FIG. 1.

It will also be appreciated that two or more separate multiple emergency brake systems could be provided, if desired. For example, the system shown for the rear wheels shown in FIG. 1 could be duplicated for the front wheels. Such duplication will also provide emergency braking when a wheel cylinder is completely damaged.

From the foregoing description, it is seen that the invention provides an improved brake system containing a plurality of safety devices and an emergency braking system, which additions do not decrease the normal operation of the brakes, yet provide needed safety feature in an inexpensive and reliable manner.

What is claimed is:

1. In a hydraulic brake system containing a master cylinder, a reservoir for supplying liquid to the master cylinder, a plurality of wheel cylinders, and liquid lines connecting the master cylinder to the wheel cylinders, in combination, return line means connecting each wheel cylinder to the reservoir, metering means in said return line means to permit a small amount of brake fluid to pass from the wheel cylinders to the reservoir on each application of the brakes, whereby substantially full braking is achieved for operation of the system during normal driving use.

2. The hydraulic brake system defined in claim 1, and wherein said metering means incorporates a metering check valve in the return line means, with the metering check valve being formed to close, after allowing a small amount of brake fluid to pass therethrough and located to provide a complete closure in the return line means after said metered amount of fluid passes on each application of the brakes so that the braking action can be had as desired in normal operation while also providing a controlled amount of recirculation on each new application of the brakes.

3. The hydraulic brake system defined in claim 2, in which there is a pair of metering check valves between each wheel cylinder and the reservoir in the return system.

4. The hydraulic brake system defined in claim 2, in which four wheel cylinders are used, the reservoir is constructed in sections and the master cylinder is a dual cylinder which also comprises a first supply line leading to two wheel cylinders and a second supply line leading to the other two wheel cylinders, and in which two return lines are provided in the return line means with one return line leading from said two wheel cylinders to one section of the reservoir and the other return line leading from the other two wheel cylinders to the other section of the reservoir.

5. The hydraulic brake system defined in claim 4, in which the reservoir has a filler cap disposed over one section thereof, and a breather disposed over the other section; said breather comprising a housing formed with two telescoping sections, said housing defining an internal chamber having a first passage extending from the chamber to the internal part of the reservoir, and a second passage formed between the telescoping section and providing a communication between the internal part of the chamber and the outside with the second passage extending vertically downward.

6. The hydraulic brake system defined in claim 4, in which an emergency brake system is provided, which comprises a source of gas under pressure, a gas passage from said source of gas in communication with the return line means at a position between the wheel cylinders and the metering check valve, and valve means for controlled opening of the gas passage and shutting off said supply lines to pressurize the brake fluid in the wheel cylinders and apply the brakes.

7. The hydraulic brake system defined in claim 1, in which the return line comprises a main line and a branch-line in communication with each wheel cylinder and a dirt trap is located at the junction point of each branch line with the main line.

8. The hydraulic brake system defined in claim 7, in which the dirt trap consists of a housing having three passages angled downwardly and joining at a point below the areas of said passages, and a bottom passage leading to said junction and containing means for closing off said bottom passage.

9. The hydraulic brake system defined in claim 1, and wherein said metering means incorporates a restriction in the return line means, with the restriction being formed to allow a small amount of brake fluid to pass therethrough on each application of the brakes so that braking action can be had as desired in normal operation while also providing a controlled amount of recirculation on each new application of the brakes.

References Cited

UNITED STATES PATENTS

| | | | |
|---|---|---|---|
| 2,255,676 | 9/1941 | O'Reilly | 188—152.14 |
| 2,295,539 | 9/1942 | Beach | 188—152.14 |
| 2,564,164 | 8/1951 | Lindeman. | |
| 2,735,255 | 2/1956 | Harper et al. | |
| 1,985,812 | 12/1934 | Banas. | |
| 2,258,019 | 10/1941 | Kramer et al. | 188—152.14 |
| 2,258,257 | 10/1941 | Main | 60—54.6 |
| 2,416,091 | 2/1947 | Fitch | 137—144 |
| 2,499,563 | 3/1950 | Bill. | |
| 2,502,050 | 3/1950 | Kattner | 60—54.5 |
| 2,524,544 | 10/1950 | Seawell | 60—54.5 |
| 2,534,381 | 12/1950 | Sebastian et al. | |
| 2,661,847 | 12/1953 | Buettner | 210—166 |
| 2,674,852 | 4/1954 | Olman. | |
| 2,767,968 | 10/1956 | Buettner | 261—121 |
| 2,866,866 | 12/1958 | Laplante | 200—84 |

FOREIGN PATENTS 491,149    8/1938    Great Britain.

MARTIN P. SCHWADRON, Primary Examiner

R. R. BUNEVICH, Assistant Examiner

U.S. Cl. X.R.

60—54.6; 188—152